United States Patent [19]

Eades

[11] 3,980,560
[45] Sept. 14, 1976

[54] FILTER CONSTRUCTION
[75] Inventor: Allison Winston Eades, Willingboro, N.J.
[73] Assignee: DeLaval Turbine Inc., Princeton, N.J.
[22] Filed: Jan. 27, 1975
[21] Appl. No.: 544,302

[52] U.S. Cl................................ 210/141; 210/232; 210/446
[51] Int. Cl.² ................... B01D 33/34; B01D 35/08
[58] Field of Search ........... 210/146, 141, 224, 230, 210/232, 236, 237, 350, 446; 220/40; 23/290; 200/110, 120, 125, 126, 246, 249, 253

[56] References Cited
UNITED STATES PATENTS

| 2,387,024 | 10/1945 | Hishon et al. | 23/290 |
| 2,718,029 | 9/1955 | Collins | 23/290 X |
| 2,732,079 | 1/1956 | Hunziker | 210/236 |
| 2,841,308 | 7/1958 | Weicker | 210/236 UX |
| 2,869,726 | 1/1959 | Hertuch | 210/146 X |
| 2,916,143 | 12/1959 | McConalogue | 210/237 X |
| 3,031,082 | 4/1962 | Smith | 210/232 |
| 3,085,689 | 4/1963 | Heriz et al. | 210/232 |
| 3,136,718 | 6/1964 | Miller et al. | 210/146 |

Primary Examiner—Theodore A. Granger
Attorney, Agent, or Firm—Hopgood, Calimafde, Kalil, Blaustein & Lieberman

[57] ABSTRACT

The invention contemplates a remotely serviceable filter of the type which accumulates a filter cake which must be periodically removed. An upper casing half is fixed, and a lower casing half accumulates the filter cake and is movable to a cake-discharge position, using first and second sequentially interlocked actuating mechanisms. Completely automated servicing of the filter is described.

19 Claims, 8 Drawing Figures

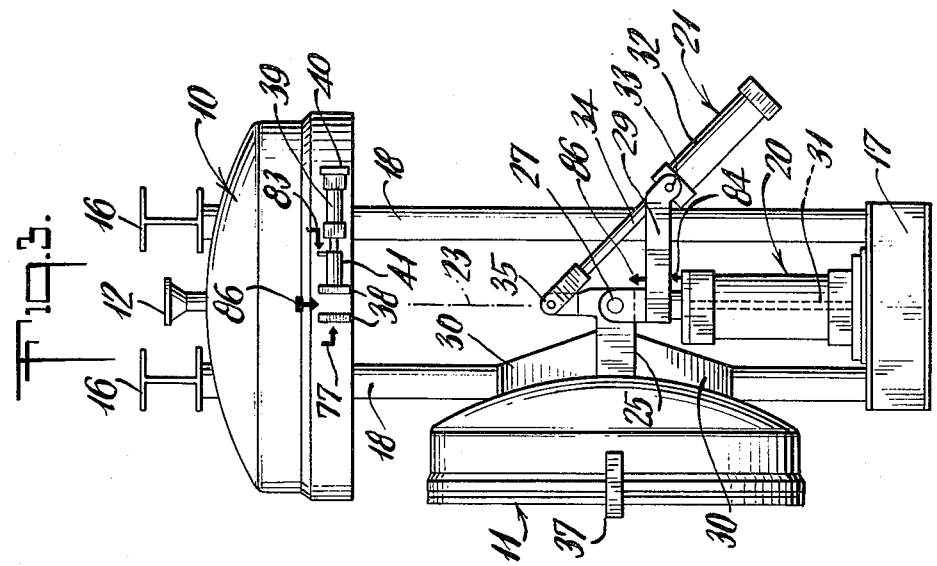
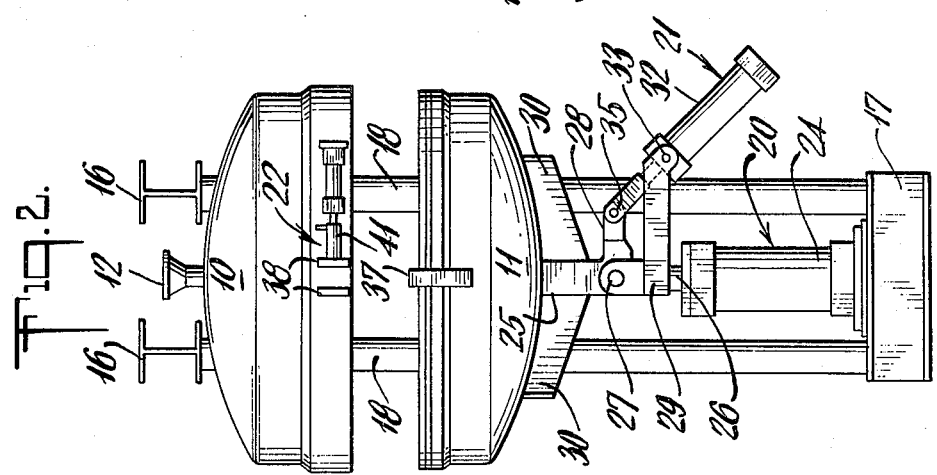
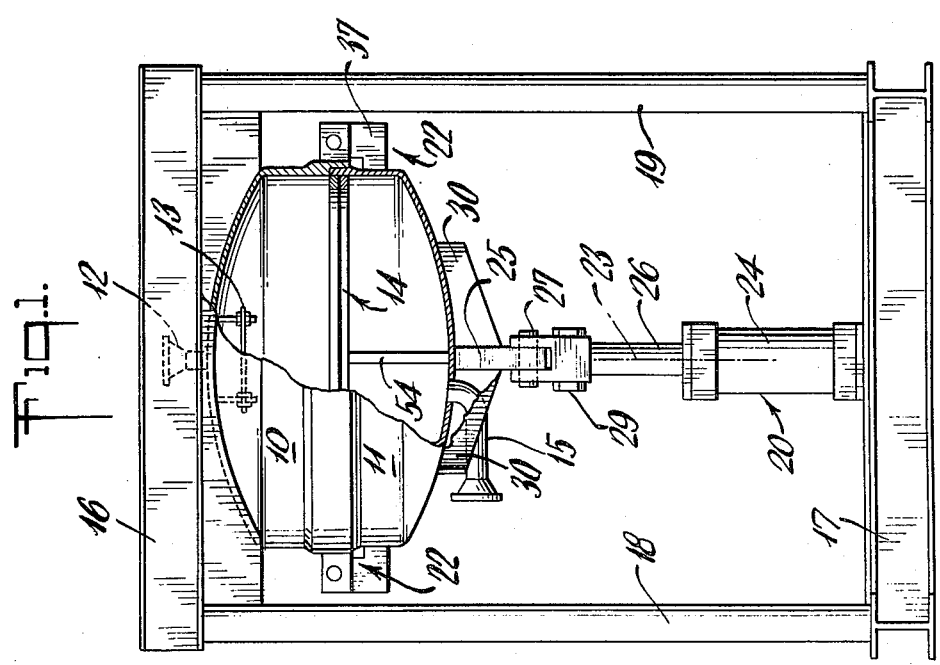

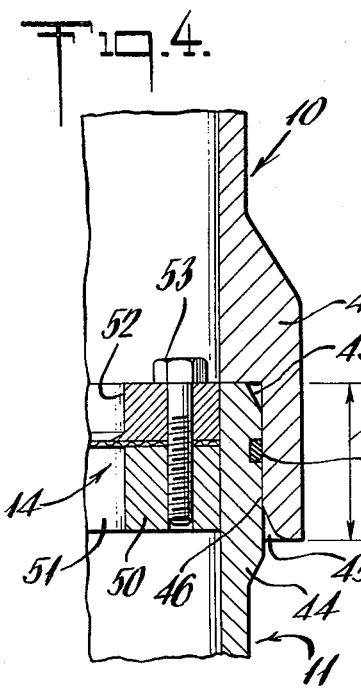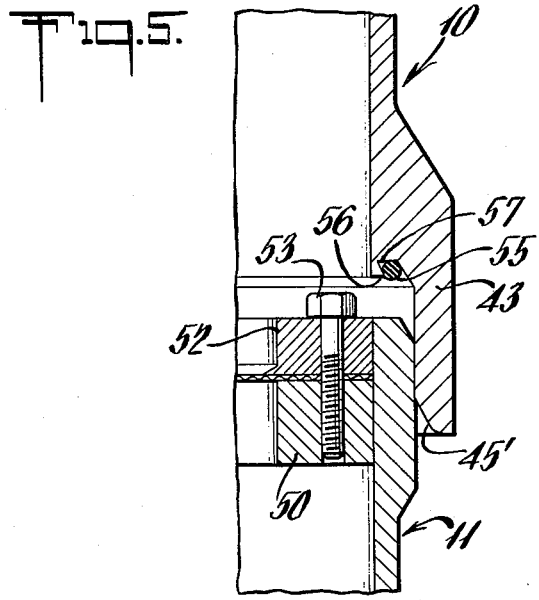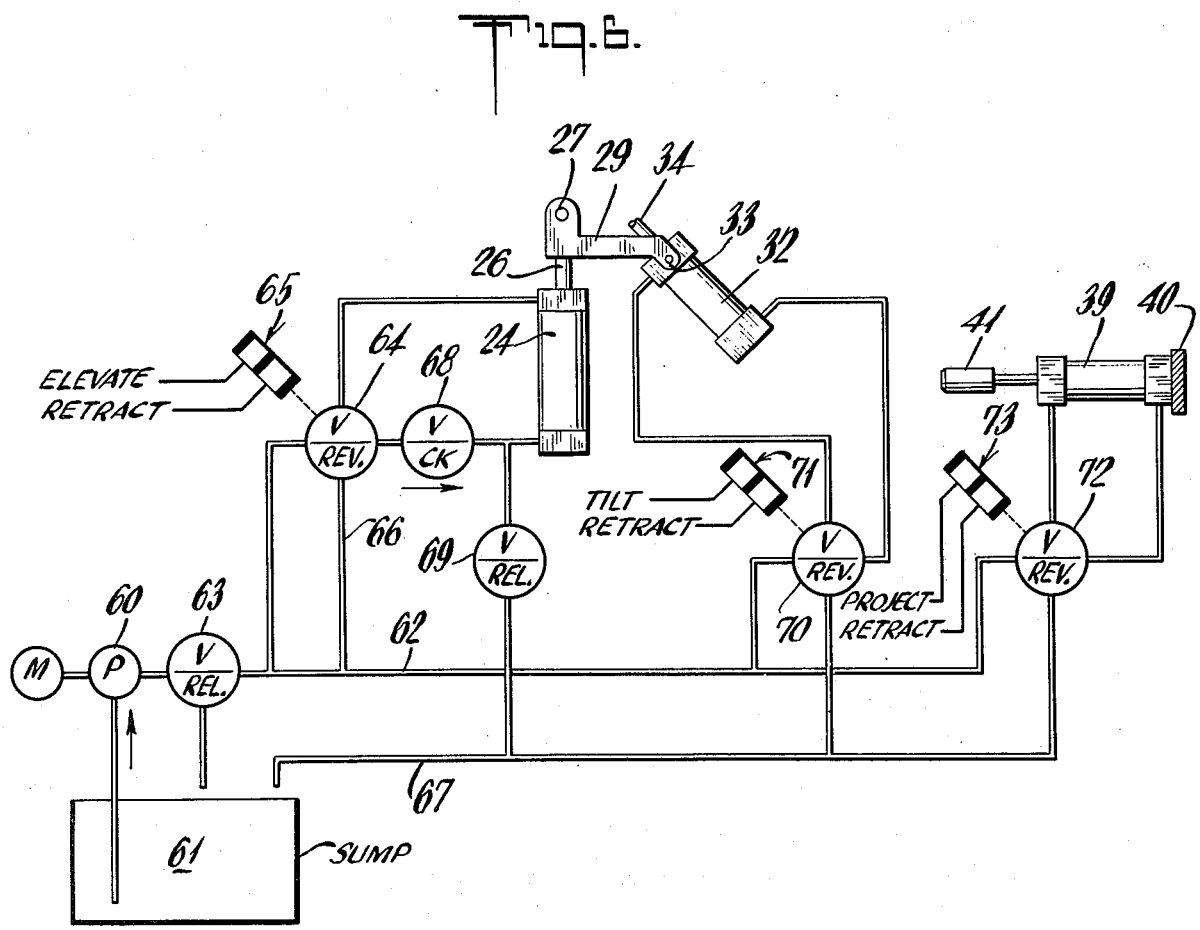

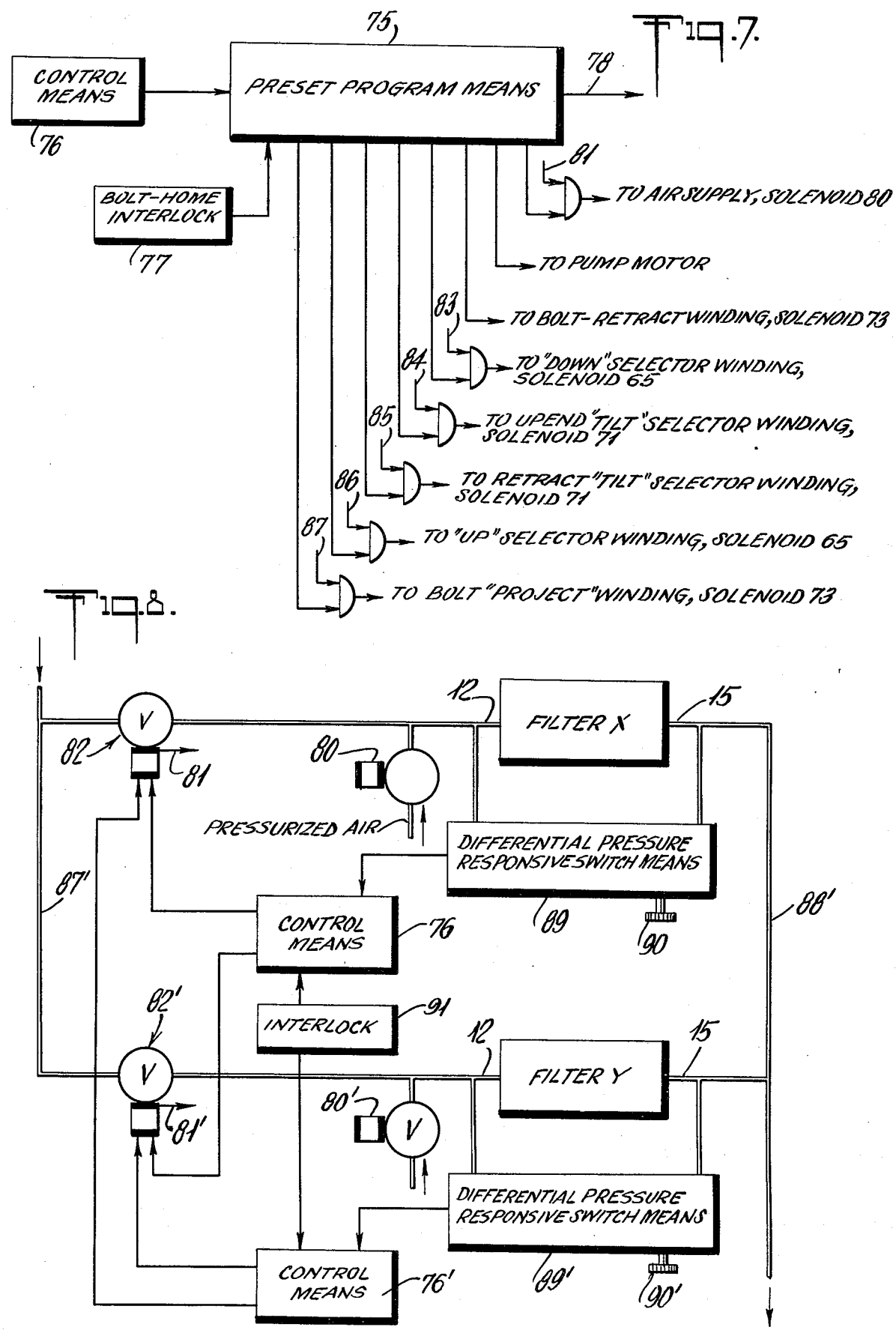

FILTER CONSTRUCTION

This invention relates to an industrial filter, for removal of water-borne solids such as radioactive waste products. The filter is of the general type which employs a supporting screen that is precoated and which accumulates a filter cake that must be removed when accumulated waste product has achieved a predetermined blockage to filtering action.

It is an object of the invention to provide an improved filter construction of the character indicated.

Another object is to provide such a filter which can be completely serviced from a remote location.

A further object is to provide such a filter which lends itself to fully automated servicing.

Another object is to provide such a filter which is particularly applicable to the safe and efficient accumulation and discharge of solid radioactive waste products.

A general object is to achieve the foregoing objects with structure and mechanism which is basically simple and reliable, and which will necessitate an absolute minimum of personnel approach.

Other objects and various further features of novelty and invention will be pointed out or will occur to those skilled in the art from a reading of the following specification, in conjunction with the accompanying drawings. In said drawings, which show, for illustrative purposes only, a preferred form and modification of the invention:

FIG. 1 is a front elevation of a filter assembly of the invention, certain parts being broken-away and in vertical section, all for the closed or operative condition of the assembly;

FIGS. 2 and 3 are similar side elevations of the assembly of FIG. 1, to show successive actuated conditions thereof;

FIG. 4 is an enlarged, fragmentary vertical sectional view of a sealed engaged relationship in FIG. 1;

FIG. 5 is a view similar to FIG. 4, to show a modification; and

FIGS. 6 to 8 are simplified diagrams schematically showing interlock and automated control connections for operation of the filter of FIG. 1.

In FIG. 1, the invention is shown in application to a filter construction of the so-called clamshell type, characterized by separable upper and lower casing halves or members 10–11 each of which is cupped, with its circular open end in sealed engagement with the circular open end of the other casing half. The upper casing member 10 has an inlet connection 12 for reception of liquid flow to be filtered, such flow being downwardly discharged upon a horizontal baffle plate 13 suspended within the dome of the closed end of member 10. Baffle-deflected inlet flow is distributed over a flat horizontal screen carried by screen-supporting means 14 at the open end of the lower casing element 11, and an outlet connection 15 to the lower domed region of element 11 provides for filter effluent discharge.

The described parts are used to form a filter precoat with filter aid, to act as a filter and, upon completion of its capacity to filter, to discharge the filter cake in a dry form; the device is also used to dewater a slurry passed through it. The method of coating the screen is conventional to precoat-type filters, and therefore this aspect and the temporary valve connections used in precoating need not be described beyond mentioning that precoating is achieved by recirculating a slurry through the screen (via inlet 12 to outlet 15) until a sufficient filter cake has formed on the screen; following formation of this initial precoat, the liquid flow to be filtered (or the slurry to be dewatered) is passed through the cake, entrapping solid particles on top of the precoat.

In accordance with the invention, the upper casing member 10 is fixed and the lower casing member 11 is removably positionable for discharge of filter-cake accumulations, successive lower-casing positions being illustrated in FIGS. 1, 2 and 3. To fixedly mount the upper casing member 10, a rigid rectangular frame is established by upper and lower beams 16–17, vertically spaced by opposed pairs of laterally opposed columns 18–19, the lower beam structure 17 providing a base for floor-mounting, as will be understood.

In a servicing cycle of the filter, first and second sequentially operative hydraulic actuating means 20–21 serve for vertical positioning and laterally offset displacement of the lower casing member 11 is a servicing cycle, and locking means 22 serves to retain members 10–11 locked together during filter operation. It will be understood that to accommodate such action, the fluid connections to movable parts, such as the exhaust effluent connection at 15, must be via flexible hose or conduit.

The first actuating means 20 provides purely vertical positioning displacement of the lower casing member 11, along the central vertical axis 23 of the filter. It is shown to comprise an upstanding hydraulic cylinder 24 secured to base 17, and aligned rod elements 25–26 in the connection of its piston to the closed end of member 11. Elements 25–26 are pinned at 27 on a horizontal pivot axis which extends laterally and symmetrically between columns 18–19, so that in tilted position (FIG. 3) the filter-screen-supporting open end of the lower casing member 11 may be substantially offset from axis 23 and from base 17, upended for discharge of a filter cake in the space between columns 18–19; preferably, the extent of the tilt offset, i.e., axial offset of the axis of pin 27 from the open end of casing member 11, is approximately the radius of the casing. The second actuating means 21 comprises a double-acting hydraulic mechanism connecting spaced offsetting arms 28–29 of the rod elements 25–26, respectively. More specifically, plural angularly spaced struts 30 stabilize the welded connection of rod element 25 to the lower center of casing member 11, element 25 being shown as one arm of a bell crank having the offset 28 as its other arm. In similar fashion, the upper end of rod element 26 includes a bell crank wherein the offset 29 is one arm and wherein clevis formations for the pin 27 constitute the other arm. The lower end of rod element 26 will be understood to be guided on a vertical axis by gland support at the tail end of cylinder 24 and by piston engagement with the inner wall of cylinder 24; key means suggested at 31 acting between the piston and the cylinder wall assure against rotation of rod element 26 and all that it carries, with respect to the upstanding axis 23; alternatively, key action may be provided by the tail-closure formations in cylinder 24, coacting with an elongated keyway in rod element 26 for the length of its stroke, as will be understood. The second actuating means 21 is shown to comprise a hydraulic cylinder 32, the tail end of which is pinned at 33 to spaced parallel offset arms 29; its piston rod 34 has a clevis-formed outer end, pinned at 35 to the offset 28. All pin axes 27–33–35 are horizontal and parallel, and the geometry is preferably selected such that rod 34 is oriented at substantially 45° to axis 23 both in the retracted limiting position of rod 34 (FIG. 2) and in the extended limiting position thereof (FIG. 3).

The locking mechanism 22 is shown in duplicate at diametrically opposed locations of telescoped engagement of the rim ends of casing members 10–11. At each of these locations, and for the raised position of casing member 11, the transverse locking-bolt aperture of a bracket 37 secured to member 11 registers with and between aligned similar apertures of spaced brackets 38 secured to member 10. Double-acting fluid-pressure operated actuating means includes a cylinder 39 mounted at 40 to member 10 and a piston rod having a cylindrical bolt 41 at its outer end for the selective passage through aligned apertures of brackets 37–38; in FIGS. 2 and 3, bolt 41 is shown in its retracted position, retained by the aperture of the right-hand bracket 38, and clear of the space between brackets 38.

FIG. 4 reveals detail of one form of sealed engagement between the closed halves 10–11 of the filter casing. As shown, the respective circular rims 43–44 are cylindrical at a region A of their telescoping overlap. A beveled upper convex corner 45 and a beveled lower concave corner 45' enable self-aligning piloted initial engagement of the overlapped cylindrical surfaces, to establish a close-clearance relation therebetween at their overlapped region 46. One of these surfaces, preferably the outer cylindrical surface of the inner rim 44, has an outwardly open peripheral groove to locate an elastomeric "O"-ring 47, and ring 47 has a sealing interference-fit relation with the adjacent inwardly facing cylindrical surface of the outer rim 43. Closure is complete when actuator 20 drives rim 44 into axially seated engagement with a shoulder stop, defined by a counterbore extending for the overlap region A in rim 43.

FIG. 4 also shows more detail of filter-screen support structure 14 in the upper open end of casing member 11. The circular outer ring 50 of a support grid 51 is secured to the inner wall of rim 44 at a downward axial offset from the upper axial end of member 11, such that an inserted replaceable screen-mounting ring 52 will be accurately located, being secured by bolt means 53 in seated relation to ring 50. A central upstanding rod 54 provides further support for grid 51.

In the alternative arrangement of FIG. 5, the casing members 10–11 are in slightly separated relation, and sealed engagement to an elastomeric seal ring 55 is by axial compression, upon driving the upper end of rim 44 into axial abutment with a shoulder or stop formation 56 in the countervore of rim 43. An axial groove 57 with an undercut radially inner wall retains ring 55, poised for compressional interference with rim 44 prior to the seating thereof to shoulder 56.

FIGS. 6, 7 and 8 are schematic diagrams to illustrate various phases of automated operation of the described filter. In FIG. 6, a motor-driven pump 60 draws upon hydraulic fluid from a sump 61 to deliver driving pressure in a high-pressure line 62, serving the various actuating cylinders 24–32–39, the pressure being relieved at a predetermined upper level by means 63. In the case of the main elevating cylinder 24, a reversing or selector valve 64 is positioned by operation of one or the other of "Elevate" and "Retract" solenoid means 65 to direct pressure fluid to the head or tail end of cylinder 24, as the case may be, while simultaneously connecting the opposite end of the cylinder 24 for fluid relief via a connection 66 to a sump-return line 67; as shown, a check-valve 68 is provided in the connection of selector valve 64 to the head end of cylinder 24, as a safety feature to hold an elevated position of casing member 11, so that if the hydraulic supply should stop, the elevated position of member 11 will be maintained. In view of the provision of check valve 68, a relief-valve connection 69 is shown to pass to the sump such fluid as is displaced from the head end of cylinder 24 upon a return or downstroke displacement of member 11.

In similar fashion, a reversing or selector valve 70 serves for the reversible supply of pressure fluid to the head or tail end of the tilt cylinder 32, depending upon whether the "Tilt" or "Retract" connection is excited at solenoid means 71, displaced low-pressure fluid being returned by valve 70 to the sump line 67. Also in similar fashion, a reversing or selector valve 72 serves for the reversible supply of pressure fluid to the head or tail end of the bolt-actuating cylinder 39, depending upon whether the "Project" or "Retract" connection is excited at solenoid means 73.

FIG. 7 is a simplified showing of preset program means 75 for the sequential control of indicated electrical elements. It will be understood that means 75 may be one of a variety of commercially available devices, for example, a cycle timer with a plurality of output control connections and with internal interlocks to assure completion of a particular function before commencement of another. Control means 76 is shown to provide a cycle-start signal to program means 75, and an interlock switch 77 is shown to respond to a "home" or bolted condition of the locks 22 for certifying to the program means 75 that a given cycle of operation has been completed, thereby enabling means 75 to recondition itself for start of a new cycle and to certify via an interlock line 78 that the filter has been reconditioned. It will be understood that line 78 may be used to establish at least one of the conditions under which a control valve is actuable to admit renewed flow of liquid to the filter inlet 12, the means for controlling such admission to effect filter pre-coating or other preconditioning of the filter screen being omitted as unnecessary to a description of the present invention. It suffices to indicate in connection with FIG. 7 that the program means has independent output control lines to the various solenoids indicated by legend and that safety interlocks for some of the functions controlled by these lines are designated by numerically identified additional input lines to AND-gate devices in the particular control connections. Thus, an air-supply solenoid 80 (to be described in connection with FIG. 8) requires for its actuation both the requisite program-generated signal from means 75 and an interlock signal in line 81 form a fluid-flow shut-off valv 82 (also to be described in connection with FIG. 8), such interlock signal certifying complete closure of the shut-off valve 82. In similar fashion, solenoid 65 requires for its "Down" winding excitation both the requisite program signal from means 75 and a bolt-retract certification, suggested by the limit-switch designation 83 in FIGS. 2, 3 and 7; solenoid 71 requires for its up-end "Tilt" winding excitation both the requisite program signal from means 75 and a down-limit certification, afforded by limit-switch means 84 (FIGS. 2 and 3); solenoid 71 requires for its "Retract" tilt winding excitation both the requisite program signal from means 75 and a cake-discharge signal, provided by means not shown in FIGS. 2 and 3 but suggested at 85 in FIG. 7; solenois 65 requires for its "Up" winding excitation both the requisite program signal from means 75 and a tilt-retraction certification, which may be provided as a second function of the limit-switch means 84; and solenoid 73 requires for its bolt-"Project" winding excitation both the requisite program signal from means 75 and a casing-closed certification, which may be provided by limit-switch means 86 responding to correctly positioned registration of brackets 37-38.

FIG. 8 schematically illustrates line-insertion and removal features for the case of two parallel-disposed like filters of the invention, designated Filter X and Filter Y, respectively, and having their respective input connections 12 served by an inlet header 87, while their outlet connections 15 are served by a filtered-effluent header 88. The arrangement is such as to sssure filtering flow from header 87 to header 88 using at least one of filters X and Y while the other is servicing itself in the cycle described in connection with FIGS. 6 and 7. Assuming that filter X has been in prolonged use, with filter Y as the standby, means such as a differential-pressure responsive switch 89 monitors pressure drop across the filter X. When a filter cake of sufficient flow impedance has accumulated at X, and depending upon the pressure-differential preselected by adjustment at 90, switch 89 will furnish a signal to the control means 76 to shut down the flow valve 82 to filter X while opening the corresponding valve 82' serving filter Y. Interlock means 91 assures against automated-shut down of both valves 82-82' at the same time.

As previously indicated, operation of control means 76 to shut down valve 82 also operates a start a program cycle at 75 and to open the air supply valve 80, thus applying pressurized air at filter inlet 12 and forcing liquid out of the casing 10-11. Program timing for this air-supply function is of sufficient further deviation to permit air flow through the cake, to the degree of drying desired for later discharge of the cake. Having sufficiently dried the cake, the air flow is stopped, and the already described manipulative cycle proceeds, the cake being gravitationally discharged as into a hopper or chute (not shown) upon upending tilt of the lower casing member 11. Return of the serviced filter to closed and locked position is certified by interlock means 77, to reset program means 75, thereby placing filter X in readiness for automtic substitution for filter Y, when the latter is disconnected upon detection of the threshold pressure drop across filter Y.

It will be seen that the described invention meets all stated objects, with simplicity, inherent reliability and with minimum need for personnel approach or involvement. Should it be necessary to service the screen itself or any other internal part of the structure, the upended full-tilt position of casing member 11 provides a degree of inspection ease and access hitherto unavailable.

While the invention has been described in detail for preferred forms, it will be understood that modifications may be made without departing from the scope of the invention.

What is claimed is:

1. A flow-operative filter construction comprising upper and lower cupped casing members having axially removable sealed peripheral engagement at the rims of their open ends, an inlet connection to the upper casing member, filter-screen support means at the upper open end of the lower casing member and an outlet connection to said lower casing member beneath and offset from said filter-support means, means fixedly mounting the upper casing member with its open end facing downwardly, support means for the lower casing member and including a vertical guide and first actuating means including an upstanding connection located under said lower casing member for selectively positioning said lower casing member between an upper position of peripherally sealed engagement to said upper casing member and a lower position in substantial axial clearance relation to said upper casing member, said upstanding connection including first and second elements hingedly related to each other on a horizontal hinge axis, the first element being secured to said lower casing member and the second element being guided by said vertical guide, and second actuating means reacting between said elements and offset from said hinge axis and operative for the lower position of said lower casing member for selectively positioning said lower casing member about said hinge axis between a first position in which said lower casing member is vertically aligned with and facing said upper casing member and a second position in which the open end and filter-screen support means of said lower casing member face generally laterally outwardly of the axis of said vertical guide, whereby a filter cake on a filter screen mounted to said filter-screen support means may be placed in up-ended orientation laterally offset from said support means for discharge to permit recycled use of the filter screen.

2. The filter construction of claim 1, in which said casing members are generally cylindrical at their open ends.

3. The filter construction of claim 1, in which said casing members are similarly domed at their closed ends and are circular at their open ends.

4. The filter construction of claim 1, in which said casing members have axially telescoping cylindrical regions of overlap at their sealed engagement.

5. The filter construction of claim 4, in which the cylindrical overlap region of one member has a peripheral groove facing the cylindrical overlap region of the other member, and an elastomeric O-ring seal member retained by the groove and having interference-fit engageability with the cylindrical overlap region of the other member.

6. The filter construction of claim 1, and including a unitary upstanding rectangular frame having spaced upper and lower horizontal beam means, said upper casing member being fixedly suspended from said upper beam means, and said first actuating means being fixedly mounted to said lower beam means.

7. The filter construction of claim 6, in which laterally opposed vertical columns space said upper and lower beam means, said hinge axis being oriented in the direction of lateral opposition of said columns, whereby filter-cake discharge may be via one offset side of the lateral space between said columns.

8. The filter construction of claim 1, in which said casings are circular at the region of sealed engagement, the hinge axis being offset below the rim of said lower casing member to substantially the extent of the radius of the circular region of sealed engagement, whereby when said second actuating means is in its second position, the location of filter-cake discharge may be substantially entirely removed from vertical register with the downwardly open end of said upper casing member.

9. The filter construction of claim 1, in which said first actuating means is hydraulic.

10. The filter construction of claim 1, in which said second actuaing means is hydraulic.

11. The filter construction of claim 1, in which said second actuating means comprises an offset arm rigidly carried by said first element and an offset arm rigidly carried by said second element, said arms being offset in the same horizontal direction away from and generally perpendicular to the hinge axis when said casing members are in vertically aligned relation, and fluid-pressure operated actuating means connecting an offset location on one arm to an offset location on the other arm.

12. The filter construction of claim 1, in which said casings include locking formations which register when said casings are in sealed engagement, and selectively operable means carried with the locking formations of one casing member for removably establishing axially locked engagement with the locking formations of the other casing member when in such registration.

13. The filter construction of claim 12, in which said selectively operable means carried with one casing includes fluid-pressure-operated means.

14. The filter construction of claim 1, in which said first and second actuating means are interlocked such that said second actuating means is operable only when said first actuating means is in its second or casing-lowered position, and such that said first actuating means is operable only when said second actuating means is in its first or hinge-elevated position.

15. The filter construction of claim 13, in which said fluid-pressure-operated means and said first actuating means are interlocked such that said fluid-pressure-operated means is operable only when said first actuating means is in its first or casing-elevated position, and such that said first actuating means is operable only when said fluid-pressure-operated means is in its condition of disengagement from the locking formations of said other casing member.

16. The filter construction of claim 6, in which said first actuating means includes a hydraulic cylinder fixedly mounted to said lower beam means, and in which said second element includes piston means guided in said cylinder, and means keying said second element against rotation with respect to said lower beam means.

17. The filter construction of claim 1, and preset program means connected in controlling relation with said first and second actuating means, such control being preset that a cycle of filter opening and service comprises the following order of operations of said first and second actuating means: (a) full-stroke downward retraction by said first actuating means, (b) full-stroke up-ending tilt projection by said second actuating means, (c) full-stroke retracting-tilt displacement by said second actuating means, and (d) full-stroke upward projection by said first actuating means.

18. The filter construction of claim 1, in which said second actuating means is of the double-acting hydraulic variety.

19. A flow-operative filter construction comprising upper and lower cupped casing members having axially removable sealed peripheral engagement at the rims of their open ends, an inlet connection to the upper casing member, filter-screen support means at the upper open end of the lower casing member and an outlet connection to said lower casing member beneath and offset from said filter-support means, means fixedly mounting the upper casing member with its open end facing downwardly, support means for the lower casing member and including a vertical guide and first hydraulic cylinder means including an upstanding connection with an upper end and a lower end and located under said lower casing member for selectively positioning said lower casing member between an upper position of peripherally sealed engagement to said upper casing member and a lower position in substantial vertical clearance relation to said upper casing member, said upstanding connection including pivot means located at its lower end, and second hydraulic cylinder means constructed and arranged to pivot said upstanding connection of the support means for the lower casing from a vertical to a horizontal position when the lower casing member is in a position of vertical clearance related to the upper casing member, whereby the filter-screen support means of said lower casing member faces generally outwardly of the axis of said vertical guide, and whereby a filter cake on a filter screen mounted to said filter-screen support means may be placed in up-ended orientation laterally offset from said support means for discharge to permit recycled use of the filter screen.

* * * * *